United States Patent [19]
Easton et al.

[11] Patent Number: 5,454,454
[45] Date of Patent: Oct. 3, 1995

[54] POLYGONAL FRICTION DISK AND METHOD

[75] Inventors: John J. Easton, Indianapolis; James P. Macey; James J. Petroski, both of Crawfordsville, all of Ind.

[73] Assignee: Raybestos Products Co., Crawfordsville, Ind.

[21] Appl. No.: 376,098

[22] Filed: Jan. 20, 1995

Related U.S. Application Data

[63] Continuation of Ser. No. 156,270, Nov. 22, 1993, abandoned.

[51] Int. Cl.⁶ .................................................. F16D 55/36
[52] U.S. Cl. .................................. 188/71.5; 188/218 XL; 192/107 R
[58] Field of Search .................. 188/18 A, 71.5, 188/218 XL, 264 AA, 264 A; 192/70.14, 107 R, 113.2, 113.23

[56] References Cited

U.S. PATENT DOCUMENTS

| | | | |
|---|---|---|---|
| 2,237,624 | 4/1941 | Oldham | 188/218 XL |
| 3,376,960 | 4/1968 | Bender | 188/218 XL |
| 3,486,588 | 12/1969 | Grego | 188/71.5 |
| 3,552,533 | 1/1971 | Nitz | 192/70.14 X |
| 4,068,747 | 1/1978 | Snoy | 192/107 R X |
| 4,173,269 | 11/1979 | Craig | 188/71.5 |
| 4,930,606 | 6/1990 | Sporzynski et al. | 188/218 XL |

FOREIGN PATENT DOCUMENTS

| | | | |
|---|---|---|---|
| 180843 | 10/1983 | Japan | 188/218 XL |
| 422884 | 9/1974 | U.S.S.R. | 188/218 XL |

Primary Examiner—Robert J. Oberleitner
Assistant Examiner—Kevin D. Rutherford
Attorney, Agent, or Firm—Juettner Pyle Lloyd & Piontek

[57] ABSTRACT

A conventional circular friction disk having a metal backing plate and outer layer of friction material is replaced by a disk having a plurality of straight outer side edges joined by curved edges, in order to effect material savings in the manufacturing process, and without significant loss in performance.

8 Claims, 2 Drawing Sheets

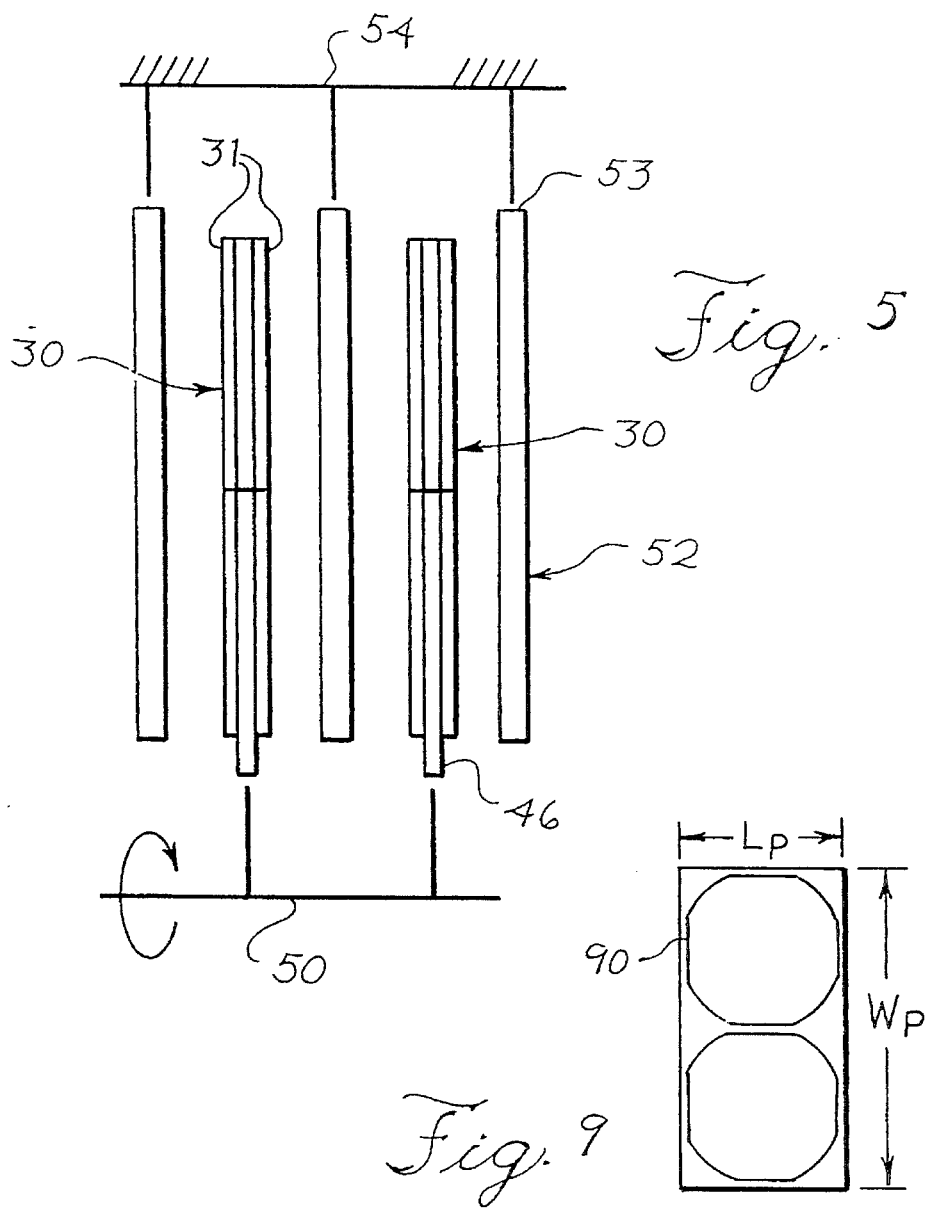
Fig. 5
Fig. 9
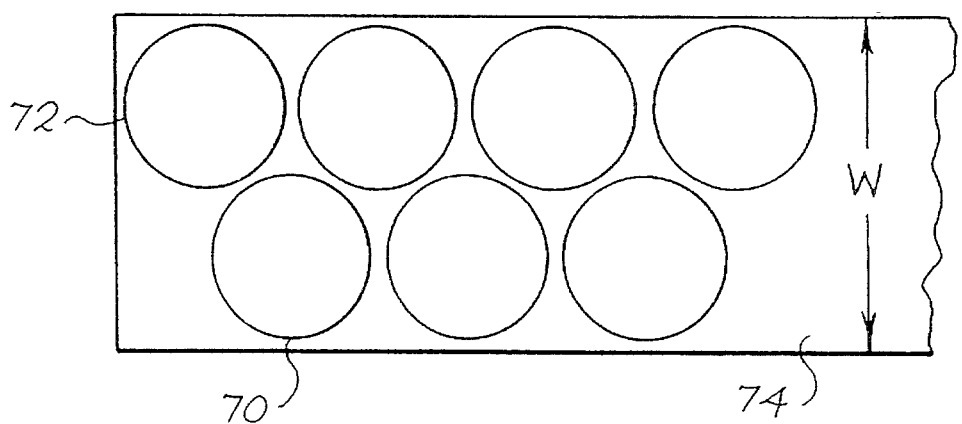
Fig. 7

POLYGONAL FRICTION DISK AND METHOD

This is a continuation of application Ser. No. 08/156,270 filed on Nov. 22, 1993 now abandoned.

BACKGROUND OF THE INVENTION

This invention relates to a friction disk used in clutch and brake assemblies in which the friction disk and a reaction plate are in relative rotation. The plate and disk are normally spaced and are brought into frictional engagement for the purpose of braking or transmission of torque.

Historically, friction disks have been made from a flat circular steel backing plate, with a circular or annular flat layer of friction material being secured to one or both sides of the backing plate or core. A splined central opening may be provided in the backing plate for mounting on a shaft, or the outer perimeter may be splined for engagement with a mating matching spline. These assemblies are either air cooled or run in a bath of liquid.

In recent times, particularly in the automotive industry, there has been a strong demand to reduce costs, and suppliers to this industry have been seeking ways to reduce the costs of various components without sacrifice to performance and service life.

In the production of friction disks, the steel backing plate for the friction material is blanked from a flat sheet of steel using a circular die, and regardless of the blanking method used, this operation results in the generation of scrap between blanked areas, which significantly contributes to the overall cost of production. The layer of friction material is often cut from blanks, usually in the form of flat rings or disks, for application to the backing plate. The blanking of the friction ring results in additional scrap because of the material between blanked areas.

SUMMARY OF THE INVENTION

An object of the present invention is to provide a noncircular friction disk and method of production thereof wherein the generation of scrap materials and associated costs are substantially reduced, while still providing a friction disk having essentially the same performance properties of a conventional circular disk of the same overall radius.

The foregoing object is accomplished by providing a friction disk with an outer circumference or perimeter generally in the form of a polygon having a number of substantially straight outer edges and a surface area of somewhat less than a conventional circular disk having the same outer radius. The use of straight sides allows for a more efficient blanking procedure, and less steel and friction material is required for the production of each disk.

Compared to a comparable circular disk having a particular or given radius, the disk of the present invention preferably comprises a number of straight perimeter edges connected by a number of circular or rounded arcs having the same radius as the given radius. For example, the disk may comprise two pairs of opposed straight edges connected by four circular arcs. Thus, compared to a circular disk, the disk of the present invention would be in the form of a circle with four equal chordal segments removed. In contrast to theoretical considerations, performance tests have demonstrated that the modified disk, even while having somewhat reduced area, has comparable capacity and other characteristics in comparison to a conventional disk, and may be actually superior in terms of failpoint.

Since the backing plate comprises straight sides, the blanking operation is more efficient than for a circular configuration, and overall material savings, typically in the order of twenty percent or greater, are realized.

BRIEF DESCRIPTION OF THE DRAWINGS

FIG. 5 is a side schematic of a conventional clutch assembly.

FIGS. 6 and 7 are plan views illustrating the blanking of steel disks for the friction disk shown in FIG. 1.

FIGS. 8 and 9 are plan views illustrating the blanking of steel disks for the friction disk shown in FIG. 3.

DESCRIPTION OF THE PREFERRED EMBODIMENTS

Figure 1:
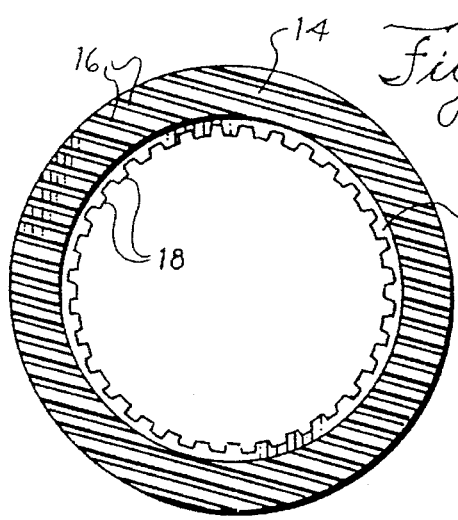
FIGS. 1 is a plan view of a conventional friction disk known in the prior art.

FIG. 1 illustrates a conventional friction disk 10. The disk comprises a circular metal or steel backing plate 12 and an annular flat ring or disk of friction material 14 secured by adhesive or other bond to the backing plate. In the version shown, the friction material 14 has grooves 16 formed therein in the outwardly facing surface. The internal circumference of plate 12 is shown as having splines 18 formed thereon for transmission of power. The friction surface of friction disk 10 is adapted to engage with a flat circular metal or steel reaction plate of approximately the same diameter, and a pair or an assembly of these members are used in transmissions, clutches, brakes and similar applications.

Friction disks of the foregoing nature are commonly used in liquid cooled application, such as transmissions, clutches and brakes. The friction material may be of any suitable type, depending on application, and may contain, organic or inorganic materials, and may be formed by any of the known processes, such as molding, compressing, or sintering. In the case of wet friction materials, the material is formulated or composed to exhibit a dynamic coefficient of friction of from about 0.06 to 0.25. Grooves may be used to facilitate circulation of the cooling medium, and the size of the grooves determine the amount of surface area in contact during an engagement. The overall size and surface area of the disk may vary widely, depending on application and required capacity and performance.

As used herein, the term "frictional material" means compositions or composites which are intended for use in clutches, transmissions, brakes, and the like, and which are specifically formulated to have stable coefficients of friction and retain their integrity at elevated temperatures and pressures. Examples include wet-layed fibers saturated with resins, reinforced elastomer-based materials, materials have a matrix of metal powders or fibers, and molded compositions containing friction modifying materials. These materials exhibit a dynamic coefficient of friction typically greater than 0.06 and usually in excess of 0.1.

Figure 2:
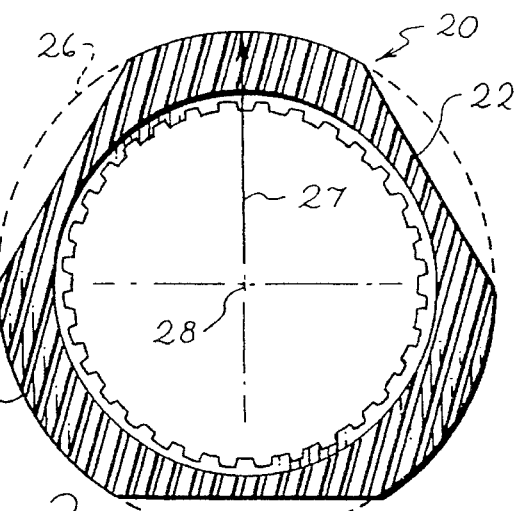
FIGS. 2, 3, 4, are plan views of friction disks made in accordance with the present invention.
Figure 3:
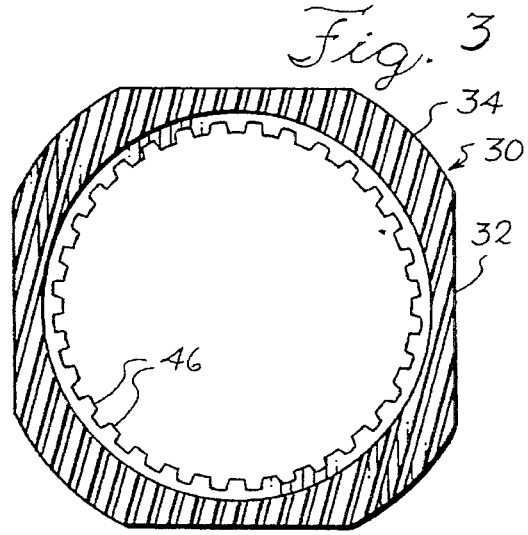
Figure 4:
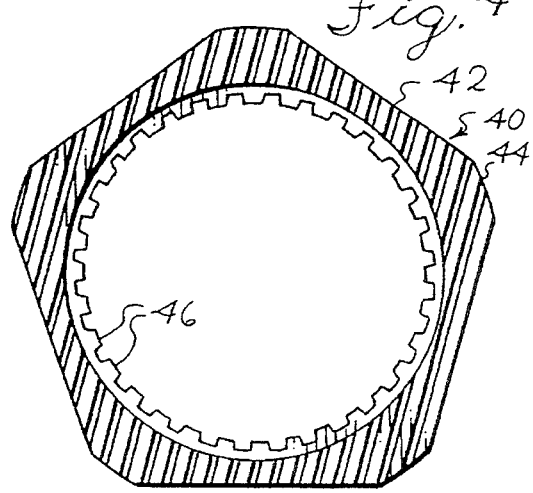

As shown in FIGS. 2, 3 and 4, it has been found that substantial material savings can be realized if the friction disk has a plurality of straight sides which are arranged in a symmetrical fashion around the central or rotational axis of the disk. Thus, the disk has at least two and preferably three or more substantially straight outside edges, which, if extended, would join at points to define as regular polygon when the disk is viewed in plan.

With reference to FIGS. 2–4, the friction disks shown are made of the same materials as the conventional disk shown in FIG. 1, in that they all have flat metal or steel backing plates and a layer of friction material on one or both sides. Except for the possible provision of grooves, the layer of friction material preferably has a uniform thickness.

FIG. 2 illustrates a friction disk 20 having three equally spaced, substantially straight outside edges 22 of equal length, joined by three circular edges 24 each having the same length. The disk 20 is intended to be used to react against a reaction plate (shown in outline at 26) having an effective outer circular radius which is equal to or greater than the maximum radius 27 of the friction plate, and a sufficient inner and outer radius, or contact area, to engage all of the friction surface. As may be seen, the friction disk 20 is symmetrical about its central axis 28.

FIG. 3 shows a friction plate 30 having four substantially straight and equal length straight outer edges 32 connected by four circular portions 34. FIG. 4 illustrates a friction disk 40 having five straight outer edges 42 connected by five circular edges 44. The friction disks are symmetrical about a central axis, and if the straight lines were extended, the shapes in FIGS. 2–4 would correspond to a regular triangle, square and pentagon, respectively. In all cases, the friction disk will contain splines, tangs or other gear means on a central opening, such as at 46 in FIGS. 3 and 4, since it would be impossible to provide a continuous or circular spline on the outer edge of these disks unless the disks are held stationary relative to the reaction plate.

FIG. 5 schematically illustrates a typical clutch assembly viewed from the side and utilizing the friction disk shown in FIG. 3. For the sake of simplicity, only the upper half of the assembly is shown. The polygonal friction disks 30 have a flat or grooved polygonal layer of friction material 31 disposed on both sides and have central splines in engagement with a splined rotatable shaft, shown schematically at 50. The circular reaction plates 52 have splines 53 on their outer circumference and are engaged with external gears or parts, such as a transmission housing shown schematically at 54. The assembly is movable into and out of engagement to bring the friction disks 30 into and out of engagement with the reaction plates 52, for the purpose of transmission of power or braking.

Figure 6:
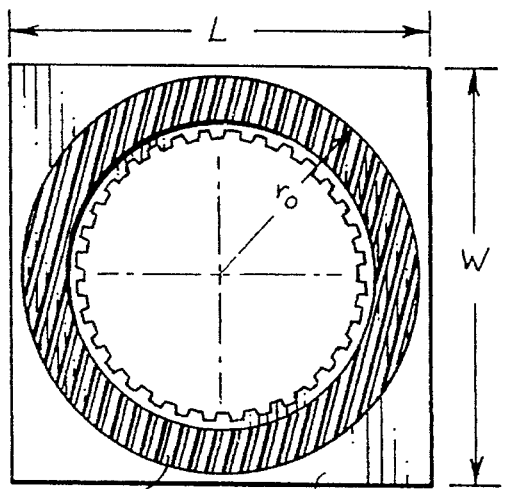

In the production of a conventional friction disk as shown in FIGS. 1 and 6, the backing plate 12 is typically cut from a flat sheet of steel 60, such as by blanking using a die and a press. If the friction material 14 is initially formed of a sheet material, such as resin impregnated friction paper, it is also cut to suitable disk or ring shape by blanking. As shown in FIG. 6, for circular disks, the surface area of the required sheet will be L times W, or somewhat greater than twice the outer radius $r_0$ of the disk, with some clearance as may be required by the blanking or stamping procedure.

Figure 8:
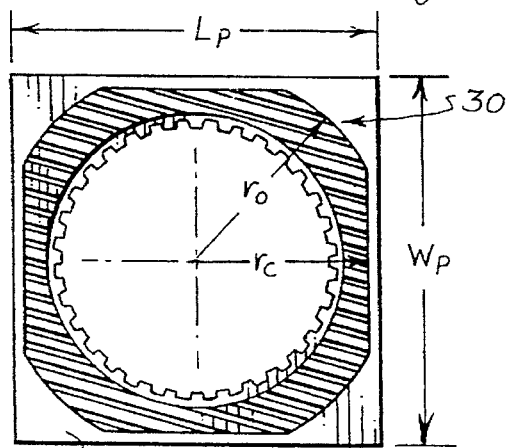

As shown in FIG. 8, if a backing plate for the disk 30 is produced having the same maximum radius $r_0$ and chordal radius $r_c$, the length and width (Lp and Wp) required for the square sheet 80 is less than FIG. 6 because of the straight side surfaces.

The amount of material savings in blanking from a square sheet can be approximated from the values of $r_0$ and $r_c$. The savings are estimated in the order of $$S=1-C^2$$

where C is the chordal radius ratio equal to the ratio $r_c$ over $r_0$ in FIG. 8. Thus, if C is equal to 0.85, the material savings are 27.7 percent less material. At a chordal ratio of 0.90, the savings would still amount to 19 percent.

Additional savings can be realized with the layer of friction material, if this layer is provided as a plurality of segments capable of being arranged in the configurations shown in the drawings. Very often, the friction material layer is blanked from a sheet of material, and a scrap can be considerable due to the central opening and the areas between adjacent blankings. If the area is subdivided into the segments having straight sides as shown in FIGS. 2–4, substantial additional savings can be realized.

In some cases, a tandem blanking method is employed, and a larger sheet 74 of steel or friction material is used to obtain a more efficient layout of the conventional circular blanking pattern as shown in FIG. 7. Here, the pattern for the circular disks such as 70 and 72 are arranged in an alternating fashion to provide more efficient material utilization than shown in FIG. 6, since the width, w, can be less. Compared to FIG. 6, a savings in the order of seven percent is realized.

FIG. 9 illustrates a tandem blanking pattern for the configuration of the backing plate shown in FIG. 3, with the length and width of the repeating patterns 90 being illustrated as $L_p$ and $W_p$. Compared to FIG. 7, the material savings are approximated as $$S=1-1.072C^2$$

where C is the chordal radius ratio $r_c/r_0$ shown in FIG. 8. Compared to FIG. 7, savings are realized at a chordal radius ratio of about 0.96 or less. At a chordal radius ration of 0.85, for example, the material savings are 22.5%.

Obviously, the other possible polygonal or quasi-polygonal shapes such as those shown in FIGS. 2 and 4 can be successfully employed in tandem blanking.

In terms of performance, it is expected that a friction surface area reduction of up to 40 percent can be made without substantial loss of performance and service life, depending on service and design conditions in the nature of the friction material employed. As the surface area of the friction surface decreases, the pressure per unit area on the surface increases, and the maximum pressure capacity of the friction material should be considered for a specific application. In the case of paper-based friction materials running in oil, the maximum unit pressure is in the order of 600 to 1000 psi, depending on material formulation. Higher unit pressures are available from other friction materials, such as metallic sintered material and elastomer-based materials.

In addition, as indicated previously, it is desirable that the friction disks of the present invention have some degree of outer circular circumference between the straight edges, in order to ensure that the entire surface of the circular reaction plate is swept by the friction surface of the friction disk. Preferably, compared to a circular disk, the disk of the present invention retains a greater than 25 percent of the circular radius, that is, the total circular radius segments combined.

In terms of material savings, it will be apparent that maximum savings can be realized if the disk has a small inner radius in relation to the outer radius, since the friction surface will be relatively wide, and the central scrap generating area is minimized.

Comparative tests have been conducted on inertial dynamometers to compare a circular disk as shown in FIG. 1 and the four sided disk shown in FIG. 3 with a reduced friction area. In these tests, the same backing plate material and friction material were employed for both types of disks, the four sided disk had outer circular segments ($r_o$) equal to the outer radius of the circular disk, and the inner radii were equal. The preliminary tests indicate, in terms of stop times and peak torque, that the capacities of the two disks are substantially the same.

The disks were also evaluated for failpoint, which is determined by continually increasing the sliding speed until the torque trace becomes erratic or the stop time deviates by more than 10 percent from that at the previous lower speed. Considerable unexpected improvements in failpoint were attained by the polygonal friction disc of the present invention. Since the primary reason for failure in this procedure is due to the thermal warping or coning of the reaction plate, the improved performance can be attributed to reduced thermal gradients in the reaction plate.

We claim:

1. A friction disk assembly, said assembly comprising a friction disk and a reaction plate for engagement with the friction disk, said reaction plate having an annular surface facing said friction disk and an outer circular radius, said friction disk comprising a backing plate having an outer perimeter and a layer of friction material secured to said backing plate and extending to the outer perimeter of said backing plate, an outer perimeter of said friction disk comprising a plurality of spaced, substantially straight edges of substantially equal length, and a plurality of circular edges connecting said straight edges, said circular edges having a radius substantially equal to said outer circular radius of said reaction plate, with said friction disk, when engaged with said reaction plate, being in full engagement at its outer perimeter along the outer circular radius of said reaction plate.

2. A friction disk assembly comprising a friction disk and a circular reaction plate, said reaction plate having an outer circular radius around a central axis and being axially engageable with said friction disk, said friction disk comprising a backing plate having an outer periphery and a layer of friction material secured to said plate and extending to the outer periphery thereof, the outer periphery of said backing plate and layer of friction material comprising a plurality of spaced arcs and a plurality of straight sides connecting said arcs, said arcs having a radius substantially equal to the outer circular radius of said reaction plate, with said straight sides of said friction disk being spaced inwardly from the outer radius of said reaction plate.

3. The friction disk assembly of claim 2 wherein the number of straight sides is equal to four, with said straight sides being equal in length.

4. The friction disk assembly of claim 2 wherein said backing plate is metallic, and said layer of friction material has a dynamic coefficient of friction of from about 0.06 to about 0.25.

5. The friction disk assembly of claim 2 wherein said friction disk has a splined central opening.

6. The friction disk assembly of claim 2 wherein said friction material layer is in the form of segments.

7. The friction disk assembly of claim 2 wherein said arcs have a combined length of greater than 25 percent of the circumference of the reaction member.

8. A friction transmission assembly comprising a reaction plate having an annular working surface area with an outer perimeter, and a friction disk having an outer perimeter and being frictionally engageable with said reaction plate, the outer perimeter of said annular working surface being coincident with the outer perimeter of said friction disk, with said friction disk and said reaction plate in frictional engagement, said friction disk comprising a plurality of straight sides spaced inwardly from the outer perimeter thereof and having a working frictional area extending to the outer perimeter thereof, the working frictional area of said friction disk being less than the annular working surface area of said reaction plate.

* * * * *